Patented Sept. 7, 1954

UNITED STATES PATENT OFFICE 2,688,585

FUNGICIDAL AND BACTERICIDAL THERAPEUTIC SOLUTION OF SULFUR DIOXIDE

Arthur S. Wilder and Jerome J. Caplovich, Worcester, and Domenic L. Bartholomew, Wayland, Mass., assignors, by mesne assignments, to Angier Chemical Co., Inc., Boston, Mass., a corporation of Massachusetts No Drawing. Application August 24, 1949, Serial No. 112,172

4 Claims. (Cl. 167—58)

The present invention relates generally to the treatment of a large variety of human and animal skin diseases and is more particularly directed to the treatment of such diseases with sulfur dioxide.

The present invention is based upon our discovery that sulfur dioxide destroys and inhibits the growth of pathogenic fungi and bacteria, which are the causative agents of a large number and variety of skin ailments, and that the local or topical application of sulfur dioxide to the situs alleviates and cures the condition associated with such organisms.

Diseases of the type referred to are caused by the presence and growth of fungus and/or bacterial organisms in the outer and inner layer of skin. These various diseases include various forms of eczema, favus (a chronic fungus disease related to ringworm), pruritus (itch), the numerous varieties of tinea trichophytina (true ringworm and athlete's foot), tinea barbae (barber's itch), tinea versicolor (a local fungus disease commonly found on the trunk), tinea auxalaryis (fungus infection commonly found in the armpits), onychomycosis (fungus disease of the toe or finger nail), otomycosis (fungus infection of the outer ear), Bacillus coli (infection of the ear and various forms of eczema of fungoid and/or bacterial origin).

We find that sulfur dioxide has strong fungicidal and fungistatic action against the pathogenic fungi that affect man including the more resistant fungi such as:

Aspergillus
Aspergillus niger
Sporothrix
Streptothrix
Blastomyces
Microsporum lanosum
Microsporum audouini
Microsporum fulvum
Fusarium oxysporum
Tricophyton metagrophytes
Trichophyton schoenleini
Epidermophyton floccosum
Candida albicans The destructive and inhibitory or antibiotic action of sulfur dioxide is effective against many pathogenic organisms, both fungoid and bacterial in origin, invading the human system. These properties are independent of the source, quality, or purity of the sulfur dioxide; the sulfur dioxide being effective in the gaseous and liquid state; when liberated from any solution, aqueous or otherwise; and when liberated from any combination or mixture of other chemicals in liquid, gaseous, or solid state.

It has been found that in many skin diseases of fungoid origin, there is often a secondary bacterial infection. We find that sulfur dioxide exerts a bactericidal and bacteriostatic action against many pathogenic bacteria and particularly against: Bacillus coli, Staphylococcus aureous and Streptococcus hemolyticus. Thus the preparation of the present invention which contains sulfur dioxide as its active ingredient is effective against the fungoid as well as against the bacterial infections that may coexist.

It is an object of the present invention to provide a preparation which is stable, will retain its potency and which may be safely applied to diseased portions of the skin, and which is non-toxic and nonirritable to the skin.

The preparation may be in the form of a solution, in the form of a dry or powder-like preparation or the like, or it may be gaseous.

When employed in solution form, an aqueous solution is preferred. However, any suitable organic solvent such as alcohol, ether, acetone, or the like, may be employed.

When an aqueous solution is employed, a small amount of a suitable organic fatty acid, preferably 1% of propionic acid is added. However, other fatty acids may be employed for the same purpose, such as caprylic or acetic acid; or the higher fatty acids as oleic or linoleic acid. The propionic acid, as well as the other organic acids, act to stabilize the solution in that it prevents the oxidation of the sulphur dioxide. The acid also acts as a catalyst facilitating the solubility of the sulfur dioxide in water.

The preferred preparation, therefore, is an aqueous solution containing 4½%–5% sulfur dioxide and 1% propionic acid. This preparation is substantially non-irritating and substantially non-toxic and is completely effective as a fungicide and fungistatic agent against the several organisms in the diseased skin, and is similarly effective against pathogenic bacteria that may coexist. The preferred acidity of the preparation is in the pH range of 1 to 2.75. However, the preparation is also effective in the range of 1 to 7. The range of 1 to 2.75 is preferred because this acidity provides for a least toxic and least irritating composition.

When this aqueous solution is applied to the skin the sulfur dioxide is liberated at contact with the skin and particularly at the infected portions for instantaneous action upon the cause of the infection.

In its solid or paste form, the preparation of the present invention would contain a sulfite such as sodium or potassium sulfite mixed with an acid salt. When this preparation is moistened to form a paste and applied to the skin, the sulfur dioxide is liberated and attacks and destroys the fungus.

The following are examples of therapeutic agents that are effective for the purposes of this invention:

*Example 1*

Five parts by weight sulfur dioxide gas
One part by volume propionic acid
Ninety-four parts distilled water The pH resulting from this mixture is in the vicinity of 1–2.75.

*Example 2*

A mixture of a sulfite and a dry organic acid, such as citric acid or tartaric acid, with a vehicle such as ordinary talcum powder, will release sulfur dioxide upon exposure to moisture. This mixture has a pH in the vicinity of 1–2.75.

*Example 3*

The anhydrous gas, 100% sulfur dioxide, under compression in a chamber equipped with a valve, may be sprayed upon the affected area.

A series of laboratory tests in vitro show the fungicidal and fungistatic action of sulfur dioxide solutions. These tests were conducted with reference to each of the organisms named hitherto, and particularly with reference to several of the most resistant strains of each. The tests show the fungistatic and fungicidal action of 4.5% aqueous sulfur dioxide. In these tests the 4.5 aqueous sulfur dioxide was diluted one hundred, one thousand and ten thousand times. The tests show the efficacy of the 100 and 1,000 dilutions and in many cases the 10,000 dilutions were just as effective. In these tests aqueous sulfur dioxide was employed without any additional agents. Clinical work has demonstrated the effectiveness of sulfur dioxide in the treatment of the enumerated diseases, the effectiveness being independent of the form or condition of the sulfur dioxide.

The therapeutic agent, which is the object of this invention and which should be available in such form that it may be applied with great facility, may therefore be rendered available to druggists, physicians and the public either in gaseous, solid, paste, or solution forms.

When it is to be employed in gaseous form, the sulfur dioxide may be compressed in valved vials or small containers and the gas may be applied to the situs by opening the valve and directing the mouth of the container toward the situs. The sulfur dioxide may be compressed in the container in its relatively pure state or it may be admixed with an inert gas such as ntirogen or carbon dioxide or the like.

In a solid or dry preparation a sulfite is employed, such as a sodium or potassium sulfite or an earth alkali sulfite as calcium sulfite. This is mixed with an organic solid acid such as citric or tartaric acid or the like, and talcum powder or other similarly inert powder may be employed as a diluent. When this mixture is applied to the affected portion of the skin, the moisture of the skin or of the air liberates sulfur dioxide. If desired this dry powder may be moistened as applied. The ingredients of this mixture may vary over a wide range as indicated by the following tabulation:

|  | Per cent |
| --- | --- |
| Sulfite | 5 to 40 |
| Acid | 5 to 40 |
| Inert powder | 20 to 90 |

The pH should be within the range of 1 to 2.75.

In its preferred form, the sulfur dioxide is made available in solution form. Any suitable solvent such as alcohol, ether, or acetone or water may be employed. The aqueous solution is preferred. Laboratory work has shown that in vitro all aqueous solution containing minute amounts of sulfur dioxide are effective. For practical purposes and to render the preparation effective for its many purposes and for the treatment of a large variety of skin diseases, particularly of fungoid origin, the solution may contain from 1% to 20% sulfur dioxide by weight. In our preferred form the solution contains 4½% to 5% sulfur dioxide by weight. In addition, it is preferred that the solution and particularly the aqueous solution should contain a small amount of the order of 1% of propionic acid. This acts in several ways. It favors the solubility of the sulfur dioxide in water and other solvents under normal conditions. A second function of the propionic acid is as an antioxidant; it protects the sulfur dioxide against conversion into trioxide or sulfuric acid. In addition the propionic acid cooperates with the sulfur dioxide in its fungicidal activity and acts as a catalyst in this process.

The amount of propionic acid may be varied and similarly the amount of sulfur dioxide may be varied. The pH of the solution may vary from 1 to 7. It is preferred that the pH should be about 2, and should fall within the range of 1 to 2.75.

In still another form the sulfur dioxide is combined with plastic resins and upon exposure to air when the preparation is applied to the skin at the site of infection, the sulfur dioxide is liberated for action upon the infection.

What we claim is:

1. A fungicidal and bacteriacidal therapeutic agent for application to the skin which comprises a solution of sulphur dioxide, propionic acid and a solvent selected from the group consisting of water, alcohol, ether, and acetone.

2. A fungicidal and bacteriacidal therapeutic agent as claimed in claim 1 wherein said solution has a pH of 1 to 2.75.

3. A fungicidal and bacteriacidal therapeutic agent as claimed in claim 1 wherein said solvent is water.

4. A fungicidal and bacteriacidal therapeutic agent as claimed in claim 1 wherein said solution is an aqueous solution having a pH of 2 and containing from about 1% to 5% sulphur dioxide and about 1% propionic acid.

References Cited in the file of this patent

UNITED STATES PATENTS

| Number | Name | Date |
| --- | --- | --- |
| 78,112 | Mariner | May 19, 1868 |
| 1,356,029 | Wesson | Oct. 19, 1920 |
| 1,499,164 | Felheim | June 24, 1924 |
| 2,289,125 | Keil | July 7, 1942 |

FOREIGN PATENTS

| Number | Country | Date |
| --- | --- | --- |
| 588,255 | Great Britain | May 19, 1947 |

(Other references on following page)

OTHER REFERENCES

Ormsby, Diseases of the Skin, 4th ed., 1934, pp. 993-4.

Di Cyan, The Drug & Cosmetic Ind., August 1944, pp. 168-9.

Carli, Chemical Abstracts, vol. 21 (1927), page 3047.

Cupr, Chemical Abstracts, vol. 20 (1926), page 3781.

Carter, Chemical Abstracts, vol. 22 (1928), page 342.

New and Nonofficial Remedies, 1951, J. P. Lippincott, Philadelphia, pp. XXVIII to XXXI.

Hoffman et al., Industrial & Engineering Chemist, June 1941, vol. 33, No. 6, pp. 749 to 751.

Rahn ibid., February 1944, vol. 36, No. 2, page 185.

Rideal, S., Disinfection and Preservation of Food, John Wiley & Sons, 1903, pp. 419 to 420.